United States Patent
Liu et al.

(10) Patent No.: US 11,322,147 B2
(45) Date of Patent: May 3, 2022

(54) VOICE CONTROL SYSTEM FOR OPERATING MACHINERY

(71) Applicant: Chien-Hung Liu, Taichung (TW)

(72) Inventors: Chien-Hung Liu, Taichung (TW); Hua-Wei Lee, Tianzhong Township (TW)

(73) Assignee: Chien-Hung Liu, Taichung (TW)

(*) Notice: Subject to any disclaimer, the term of this patent is extended or adjusted under 35 U.S.C. 154(b) by 0 days.

(21) Appl. No.: 16/969,306

(22) PCT Filed: Jul. 30, 2018

(86) PCT No.: PCT/CN2018/000274
§ 371 (c)(1),
(2) Date: Aug. 12, 2020

(87) PCT Pub. No.: WO2020/024074
PCT Pub. Date: Feb. 6, 2020

(65) Prior Publication Data
US 2021/0151050 A1 May 20, 2021

(51) Int. Cl.
*G10L 15/22* (2006.01)
*G05B 19/402* (2006.01)
*G10L 15/30* (2013.01)

(52) U.S. Cl.
CPC .......... *G10L 15/22* (2013.01); *G05B 19/402* (2013.01); *G10L 15/30* (2013.01); *G05B 2219/33099* (2013.01); *G05B 2219/35453* (2013.01); *G10L 2015/223* (2013.01)

(58) Field of Classification Search
CPC .................................. G10L 15/22; G10L 15/30
See application file for complete search history.

(56) References Cited

U.S. PATENT DOCUMENTS

| | | | | |
|---|---|---|---|---|
| 4,462,080 A | * | 7/1984 | Johnstone | G05B 19/409 704/200 |
| 7,103,545 B2 | * | 9/2006 | Furuta | E02F 9/26 704/275 |
| 10,522,136 B2 | | 12/2019 | Huang et al. | |

FOREIGN PATENT DOCUMENTS

| | | |
|---|---|---|
| CN | 1811633 A | 8/2006 |
| CN | 101430545 A | 5/2009 |
| CN | 103050118 A | 4/2013 |

(Continued)

*Primary Examiner* — Ibrahim Siddo
(74) *Attorney, Agent, or Firm* — Karin L. Williams; Alan D. Kamrath; Mayer & Williams PC

(57) ABSTRACT

A voice control system for operating machinery mainly comprises: an autonomous reaction device (1) for receiving input of a voice command (11) to establish or perform operation of at least one machining task of a specific set of industrial machinery; an interaction manager (2) for receiving and outputting the voice command (11), the interaction manager (2) including interpreting an acoustic modeling algorithm, and identifying the voice command (11), so as to form an identification instruction (21), and the interpreted identification instruction (21) forming a basic machine control command and/or a machine motion control command corresponding to the operation of multiple machining tasks of the industrial machinery; and an upper controller (3) for receiving the basic machine control command and/or a machine motion control command, and operating a system of a driver (44) of the industrial machinery by voice input.

5 Claims, 5 Drawing Sheets

(56) References Cited

FOREIGN PATENT DOCUMENTS

| | | |
|---|---|---|
| CN | 204740458 U | 11/2015 |
| CN | 105137860 A | 12/2015 |
| CN | 106335045 A | 1/2017 |
| CN | 110085230 A | 8/2019 |
| GB | 2354909 A | 4/2001 |
| JP | S57156145 A | 9/1982 |
| WO | WO2019123187 A1 | 6/2019 |

* cited by examiner

VOICE CONTROL SYSTEM FOR OPERATING MACHINERY

TECHNICAL FIELD

The present invention relates to a voice control system for operating machinery, and, more particularly, to an industrial machinery and method for man-machine interaction through a voice input manufacturing program.

BACKGROUND ART

Computer numerical control (computer numerical control: CNC) machine tools include: CNC milling machines, CNC lathes, CNC wire cutters, etc.; however, industrial-type CNC machine tools must be equipped with a dedicated controller for precise operation. Thus, a CNC machine tool controller is the brain of CNC machining equipment, and its model number is usually indicated on the top of the machine screen.

When a computational operation of an industrial machinery starts executing machining, the instructions of the CNC program are sent to the CNC controller for interpretation. After the CNC controller interprets the instructions, through the electromechanical system and drive system of the CNC machine tool (e.g. servo motor, ball screw and bearings, optical ruler, and feedback systems), the required actions corresponding to the CNC program instruction are executed.

The main software components of PC-based and non-PC-based and Windows-based CNC controllers include: operating systems (OS), human machine interfaces (MMI), programmable logic controls (PLC), interpreters (interpreter), motion controls, transmission controls, etc. and the main hardware components include: industrial computers, I/O boards, motion control axis cards, data transmission boards, and analog signal control boards, etc. In addition, servo components include: AC/DC servo drivers, motors, stepper motors, and spindle motors, etc.

For a digital control system of a CNC, a key portion between the output of the front-end CAD/CAM software and the back-end machine motion command input requires a translation program to translate the NC code into a motion command. A variety of software is usually installed on the CNC controller, such as operating system (operating system OS) software and functional application software (functional application software). An interpreter (interpreter) is a translation program that converts source code (source code) into object code (object code). Most CNC controllers need to translate the source code (source code) into the object code (object code) according to API instructions of the back-end device.

Thus, the present invention is oriented toward the development of machining intelligence and manufacturing intelligence using a voice user interface unit compiling program of a smart microphone of a voice-based internet-of-things (IoT) apparatus (virtual digital assistant, household robot etc.) to run a plug-in compiler program design, capable of not interfering with existing PC-based and Windows-based CNC controllers. The present invention inputs the source code into the compiling program of an existing CNC controller through a voice control method, thereby increasing input flexibility for program execution.

SUMMARY OF INVENTION

An objective of the present invention is to provide a voice control method that is appropriate for use in a voice control apparatus that is linked to a network. The voice control method comprises the following steps: receiving a voice command, performing a voice recognition discrimination action on the voice command to obtain a machine basic control command and/or a machine motion control command corresponding to the voice command, according to the machine basic control command and/or the machine motion control command, determining a rights information corresponding to the machine basic control command and according to at least one of the rights information or at least one of the machine motion control command and the operational condition information, accessing a source code and a host code to control an industrial machinery through an online transmission of a network.

A second objective of the present invention is to provide a user issued machine basic control command, which is a detection command to detect the various status signals read and responded to of the work machine voice control system of the industrial machinery.

Another objective of the present invention is to provide a user issued machine basic control command, which is an engineering command to respond to a machining status of the industrial machinery, the estimate machining time, or initiation of various types of machining priority modes of the work machine voice control system.

Another objective of the present invention is to provide axial positioning of a machine tool. The machine motion control command of the motion parameters, such as the moving speed and turning angle etc., is a type of motion command, which executes different multi-tooling methods, processing schedules, or work machine voice control system specific machining programs.

A work machine voice control system capable of achieving the above objectives of the present invention comprises:

an autonomous reaction device, receiving an input of a voice command to establish or to execute a conditional request operation (conditional request) of at least one machining task of a specific industrial machinery, and responding to the accuracy of the input of the received discrimination instruction, then, completion of the execution of the processing of the discrimination instruction;

an interaction manager device for receiving the output of the voice command and concurrently initializing a return command (return command) of the voice command, the interaction manager device comprises executing an acoustic modeling algorithm interpretation and discrimination on the voice command to generate a discrimination instruction, or through a connection (connecting line), connecting with a cloud service executing an acoustic modeling algorithmic computational interpretation and discrimination on the voice command to generate a discrimination instruction, the interpreted discrimination instruction, generated into a machine basic control command and/or a machine motion control command, is loopback (loopback) to the autonomous reaction device, thereby, making the discrimination instruction become the industrial machinery characterized machine basic control command, and the machine motion control command, increasing the efficiency of the industrial machinery, the discrimination instruction of the interaction manager device is automatically transmitted back to the autonomous reaction device according to the return command (return command) to execute transmission of the machine basic control command and/or machine motion control command corresponding to the conditional request operations of machining tasks of the industrial machinery; and a upper controller, receiving the machine basic control command and/or the machine motion control command to operate a driver of the industrial machinery.

DESCRIPTION OF REFERENCE NUMERALS

1—autonomous reaction device; 11—voice command; 2—interaction manager device; 21—discrimination instruction; 3—upper controller; 31—memory unit; 32—processing unit; 33—communication network; 4—industrial machinery; 41—interpreter device; 42—logic controller; 43—database; 44—driver; 5—cloud service; 6—connection.

DETAILED EMBODIMENTS

Figure 1:
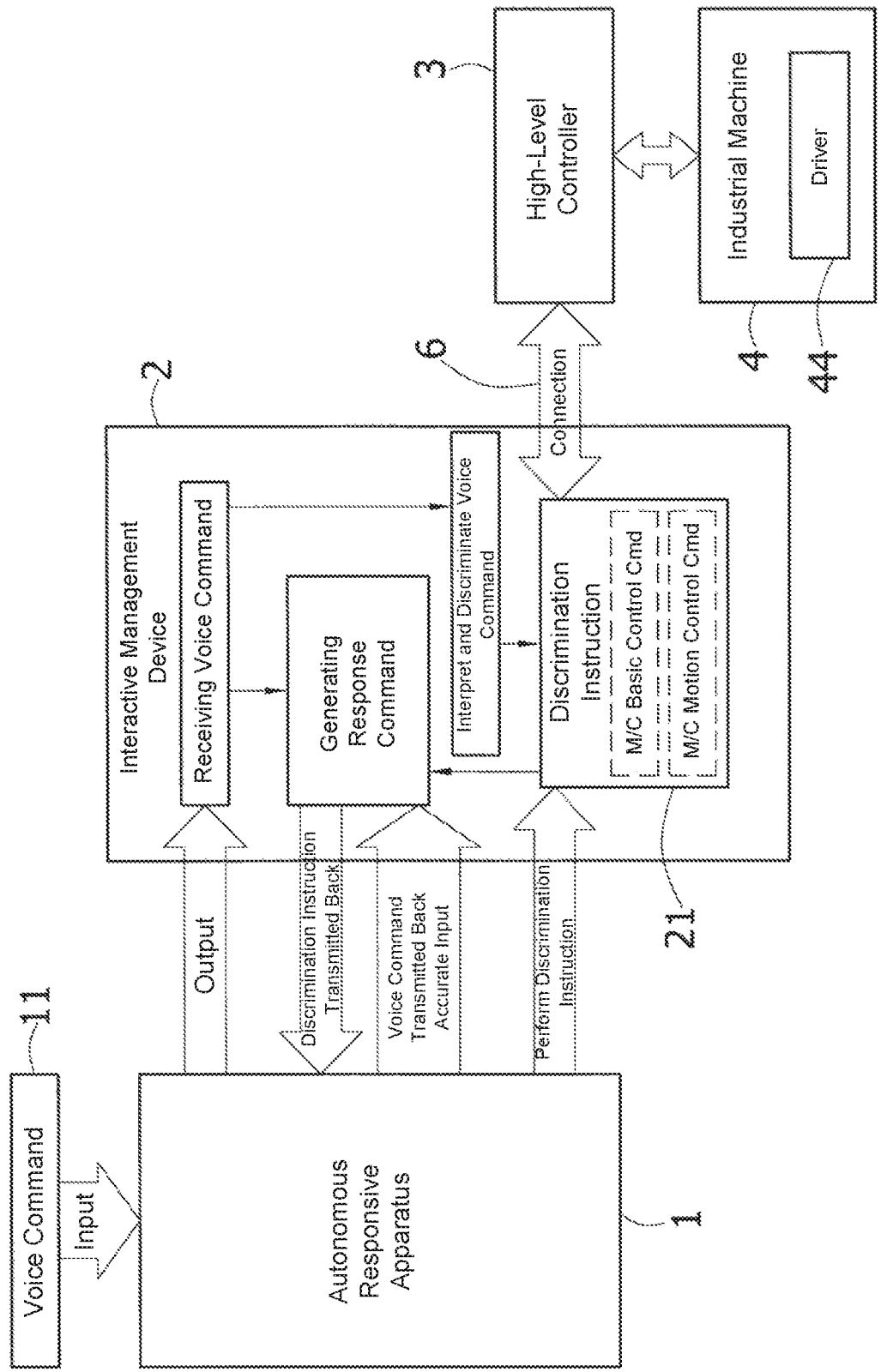
FIG. 1 is a block diagram of an example architecture of a voice control system for operating machinery.
Figure 2:
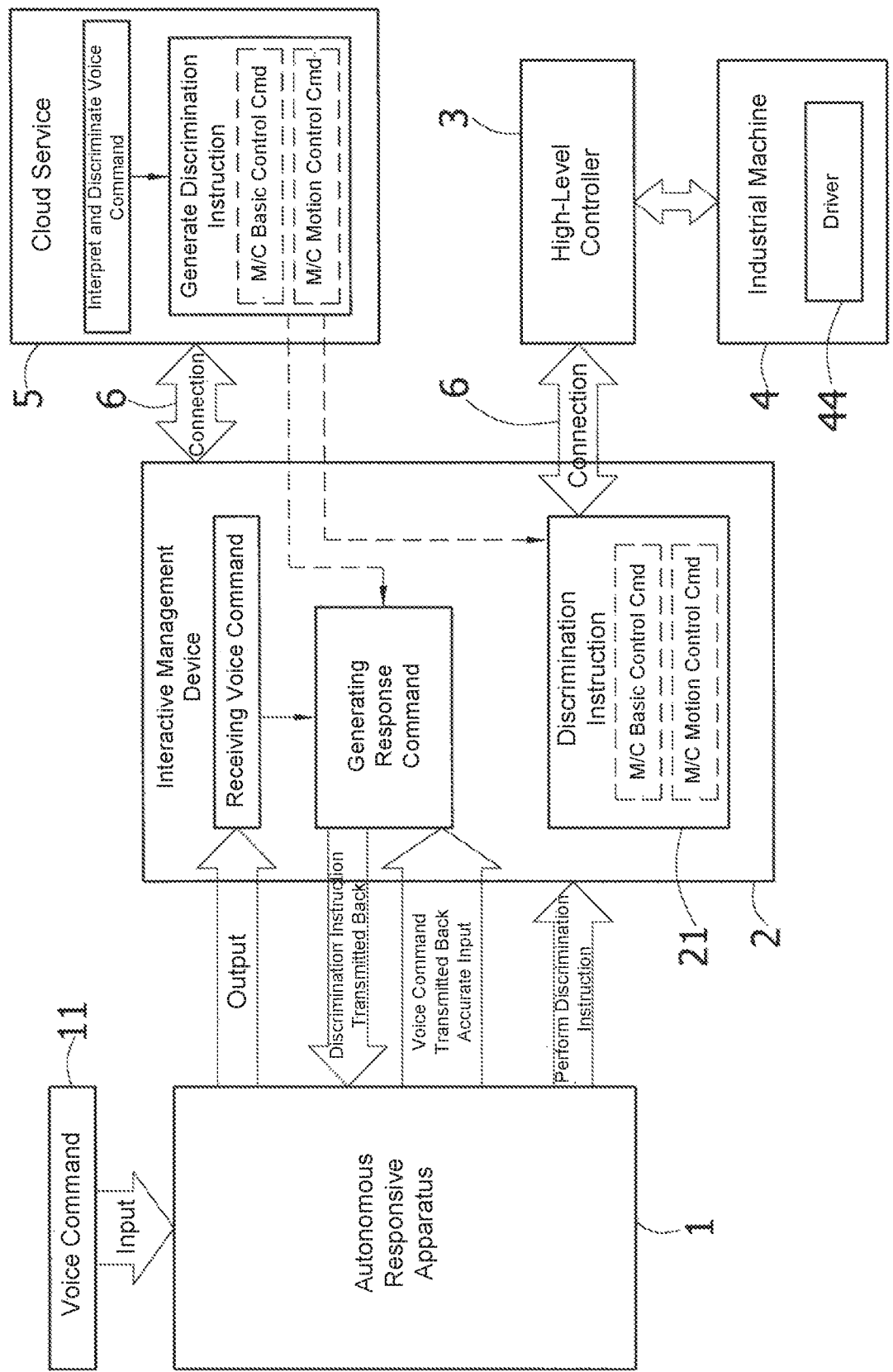
FIG. 2 is a block diagram of an example architecture of a voice control system for operating machinery connected to a cloud service.

Referring to FIG. 1 the voice control system for operating machinery provided by the present invention mainly comprises an autonomous reaction device 1, an interaction manager device 2, and a upper controller 3, wherein the autonomous reaction device 1 is connected to at least one driver 44, mounted in at least one industrial machinery 4 through a connection 6 (connecting line), wired or wireless. The autonomous reaction device 1 is capable of receiving an input of a voice command 11 (voice command). The interaction management device 2 discriminates the input of the voice command 11 to establish or execute (pursue) a specific discrimination instruction 21 (discrimination instruction), or the interaction management device 2, through a connection 6 (connecting line), transmits, or records the execution, or completes at least an aspect of a machining task of the voice command 11 output to a cloud service 5 (as shown in FIG. 2). The cloud service 5 performs computational interpretation (interpretation) and discrimination (discrimination) of the voice command 11 to generate a discrimination instruction 21 (discrimination instruction) which is loopback and provided to the interaction manager device 2. The interaction manager device 2 and/or the high level controller 3 receive a machine basic control command (basic machine control command) and/or a machine motion control command (machine motion control command) for completion of a machining objective. In addition, the high level controller 3 is capable of receiving the machine basic control command and/or the machine motion control command from the interaction manager device 2 or the cloud service 5 through a connection 6 (connecting line), and is also capable of storing the machine basic control command, or the machine motion control command, or information in the cloud service 5 through the interaction manager device 2. For example, information is capable of being stored through a wired or wireless connection 6 (connecting line), connecting a part of or all of the machine basic control command and/or the machine motion control command output, including a voice command output, a parameter command output, a voice command in the cloud service, an input/output history of the voice command in the cloud service, and including using a front- and back-end relationship instruction for the operation of the driver 44.

Furthermore, the autonomous reaction device 1 is an input device of a plurality of machining tasks of one or a plurality of drivers 44 of the industrial machinery 4 for implementing the machine basic control command and/or the machine motion control command, is an independent system or a group and group system in accordance with a machining process (finishing process). The autonomous reaction device 1 receives an input of the voice command 11 for implementing a set of machining tasks (for example, a manufacturing machining task of a machine manufacturing) of a specific industrial machinery 4 or a parameter task process (for example, precision machining (fine finish)), and through the input of the voice command 11, establish or execute one or a plurality of conditional request operations (conditional request) of a distinguishing machining task or generate a conditional request operation (conditional request) of a distinguishing motion parameter task. The voice command 11 comprises of two parts, an acoustic model and a language model, establishing a voice model according to the voice characteristics of the input person, performing analysis on the input voice signal, and extracting required characteristics. Based on the previous, the voice command 11 required for voice identification is established and the input of the voice command 11 of the autonomous reaction device 1 is capable of being an external voice command or an information voice command (comprising sound, as an example, voice vocals, environmental noise or vocals, warnings). Also, the voice command 11 comprises instructions, records, and dimensions results, etc. Moreover, the voice command 11 can be separated into four regions according to the strength/weakness of a human input voice command 11. The strength level of the voice command 11 is usually expressed in dB SPL (sound pressure level, sound pressure level): a high linear (high linear) region (for example, greater than 90 dB SPL); a compression (compression) region (for example, 55~90 dB SPL); a low linear (low linear) region (for example, between 40~55 dB SPL); an expansion (expansion) region (for example, less than 40 dB SPL). The field of the above-mentioned industrial machinery 4 includes a variety of punches, spring machines, pipe bending machines, tapping machines, tool machines, grinding machines, rubber/plastic machines, robotics, robotic arms, automated manufacturing controls, semiconductor devices, LCD devices, LED devices, PCB devices, energy-saving devices, and solar devices etc. fields, and other existing industrial control fields. Also, the autonomous reaction device 1, through continuous transmission (continuous transmission) technology, responds to the accuracy of the discrimination instruction 21 transmitted back from the interaction manager device 2 and input of the voice command 11, confirming execution of the discrimination instruction 21.

The interaction manager device 2, receives the output of the voice command 11 and concurrently initializes a return command (return command) of the voice command 11. The interaction manager device 2 comprises implementing an acoustic modeling algorithm (comprising the following four types: dynamic time warping (Dynamic Time Warping, DTW), hidden Markov model (Hidden Markov Model, HMM), artificial neural network (Artificial Neural Network, ANN), and edge computational (Edge Computing)), interpretation and discrimination of the voice command 11 to generate the discrimination instruction 21, to learn the vowels, consonants, numbers, large vocabulary amount, non-specific people, and continuous voice recognition of the discrimination instruction 21 or through a connection 6 (connecting line), connecting to a cloud service 5, executing acoustic modeling algorithm computational interpretation and discrimination of the voice command 11 to generate a discrimination instruction 21, to learn the vowels, consonants, numbers, large vocabulary amount, non-specific people, and continuous voice recognition of the discrimination instruction 21 which is loopback (loopback) and provided to the interaction manager device 2. The interpreted discrimination instruction 21 is generated into a machine basic control command and/or a machine motion control command, further making the discrimination instruction 21 become an industrial machinery 4 machine basic control command characteristic, and enhancing the machine motion control command of the industrial machinery 4 efficiency. The discrimination instruction 21 of the interaction manager device 2, according to the return command (return command), is automatically transmitted back to the autonomous reaction device 1 to execute transmission (transmission) of the machine basic control command and/or the machine motion control command corresponding to a conditional request operations (conditional request) of a machine task of the industrial machinery 4. However, the embodiments of the acoustic modeling algorithm can be implemented without these detailed particulars. The industrial machinery 4 receives the machine basic control command and/or the machine motion control command from the interaction manager device 2, connecting to the autonomous reaction device 1 (as shown in FIG. 1) or the cloud service 5 (as shown in FIG. 2) through a connection 6 (connecting line), from an input.

Figure 3:
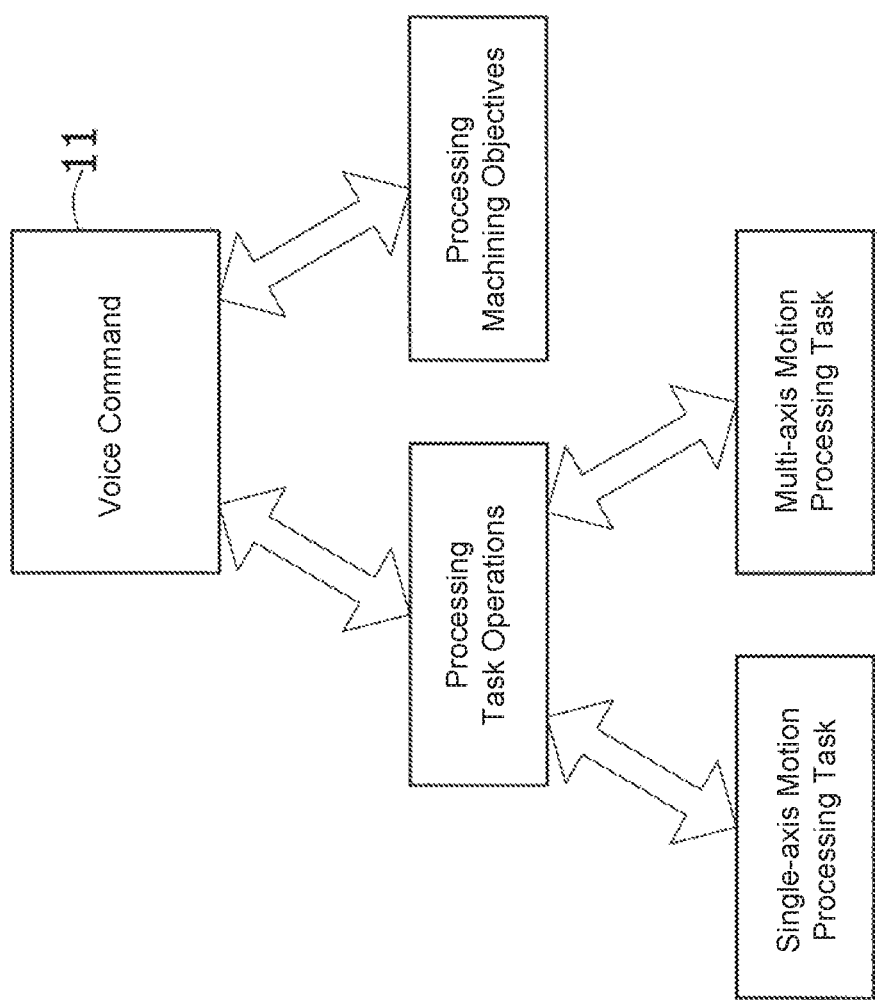
FIG. 3 is a relational diagram of a front- and back-end of an operational aspect of an input of a voice command of the present invention.
Figure 4:
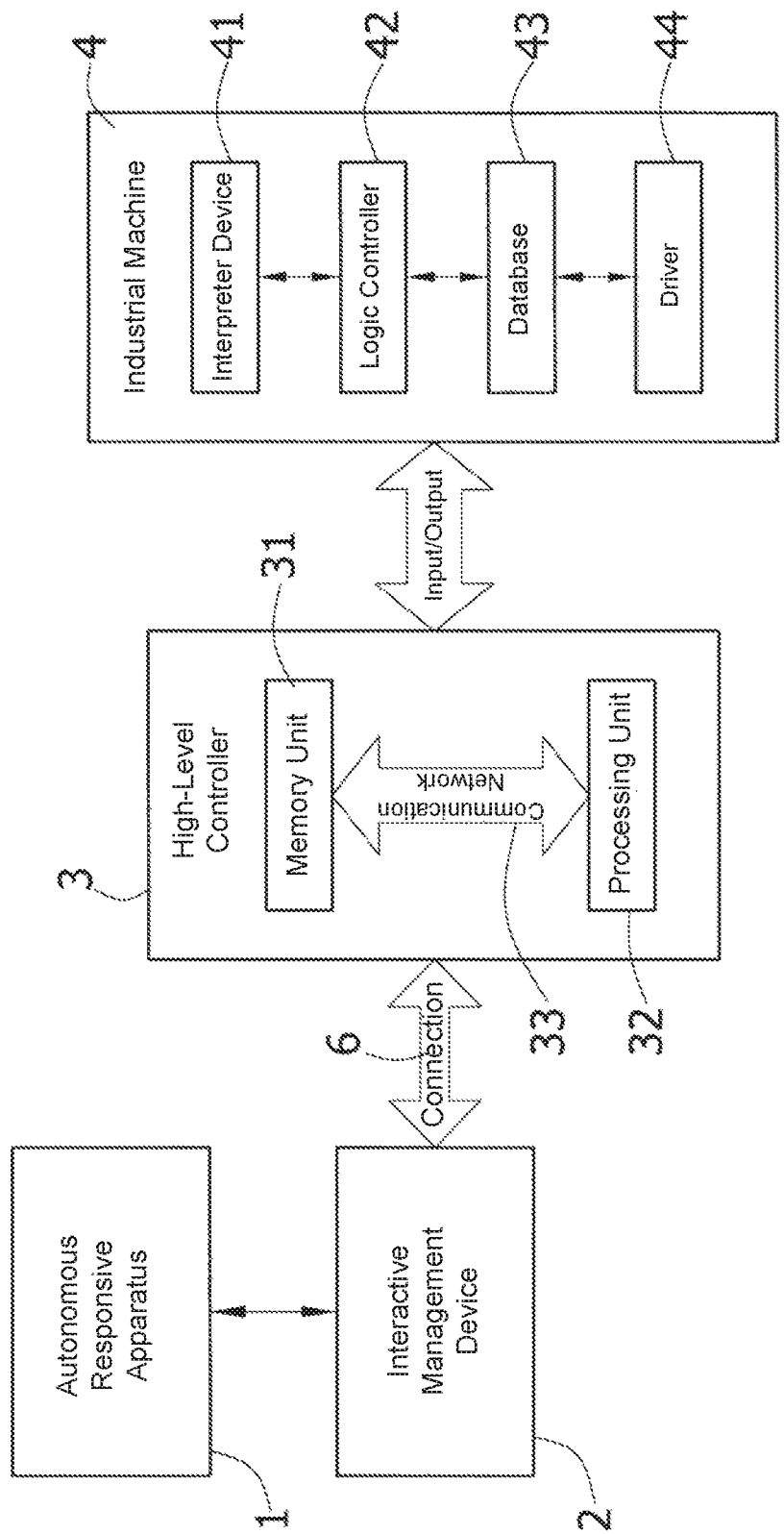
FIG. 4 is a conceptual block diagram of the example of an industrial machinery according to an input control of a voice command of FIG. 1.
Figure 5:
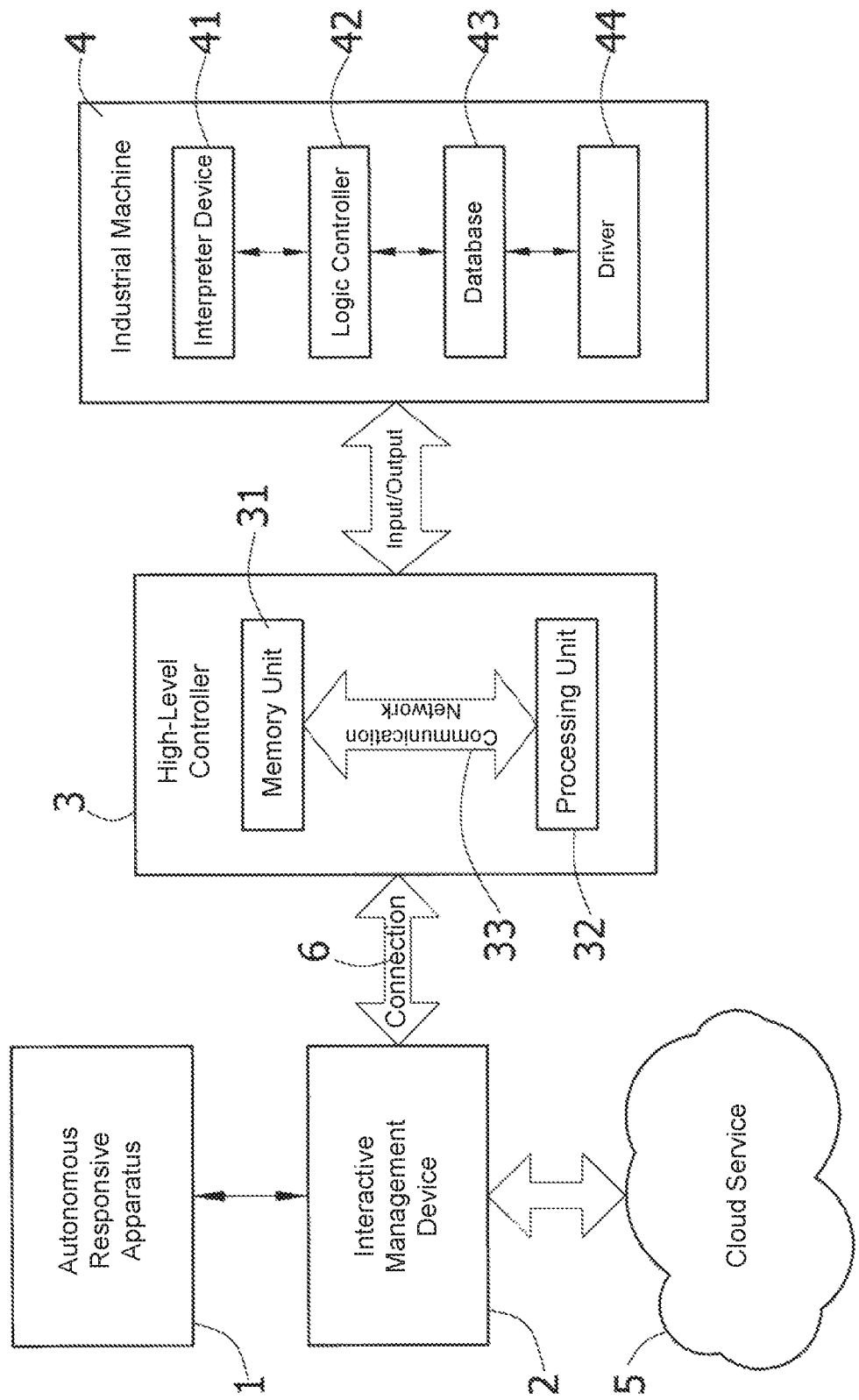
FIG. 5 is a conceptual block diagram of the example of an industrial machinery according to an input control of a voice command of FIG. 2.

The upper controller 3, through a spread activation (spread activation) of concepts within a semantic network (semantic network) set, receives a voice command 11 of a machining process task of the industrial machinery 4 or a process machining target to generate a machine basic control command and/or a machine motion control command (as shown in FIG. 3), and under a command of the upper controller 3, executes the operations of the driver 44 of the industrial machinery 4. Like, as shown in FIGS. 4 and 5, the upper controller 3 comprises a group of three functional blocks to define the functional structure, comprising: a structure of a memory unit 31, a processing unit 32, and a communication network 33 for transmitting information between the memory unit 31 and the processing unit 32. The memory unit 31 comprises a memory hierarchy, the memory hierarchy comprises an episodic memory (episodic memory), short term memory (short term memory), and long term memory (long term memory). The episodic memory is for receiving a data impression (data impression) of the machine basic control command and/or the machine motion control command and the accompanying learning instructions (learning instructions). The short-term memory is for developing a database 43. The machine basic control command and/or the machine motion control command is capable of being temporarily stored in the database 43, and is capable of being accessed at any time in a short period cycle. And, the long term memory is for storing the database 43 and adding the database 43 to the semantic network. The functional unit in the processing unit 32 is to process the memory information stored in the memory unit 31 to assist in the learning of the upper controller 3 or the industrial machinery 4. It should be understood, that the high level controller 3 is capable of establishing the input of the generated machine basic control command and/or the machine motion control command from the machining task or machining process objective voice command 11 determined by the autonomous reaction device 1. As shown in FIG. 3, in order to assist in completing the machining objective, the input of the voice command 11, generating the machine basic control command and/or the machine motion control command, is through a connection 6 (connecting line) enabling connection with the high level controller 3 for completing the machining task of the industrial machinery 4, the machining task further comprises an operation conditional request (conditional request) of at least one single-axis motion machining task or at least one multi-axis motion machining task or is learning, and analysis of corresponding control data of the machining task of the industrial machinery 4. The single-axis motion machining task comprises a basic single-axis motion control of any single-axis driver in the industrial machinery 4 performing zone return, jog, positioning, and handle movement etc. The multi-axis motion machining task comprises automatically executing interpretation of at least one machine basic control command and/or at least one machine motion control command, and according to the content described therein, executing a plurality of driver parameter fetch, process decision-making, control cycling, and performing multi-axis motion control etc. intelligent operations.

In efforts to achieve the above objectives, a voice work machine control method of the present invention is provided, comprising the following steps in one period cycle:

Step 11: an autonomous reaction device 1 is capable of receiving an input of a voice command 11 (voice command) to establish or execute a conditional request operation (conditional request) of one or more machining tasks of a specific industrial machinery 4;

Step 12: an interaction manager device 2 receives the output voice command 11 of the autonomous reaction device 1, the interaction manager device 2 concurrently initializes a return command (return command) of the voice command 11;

Step 13: the interaction manager device 2 executes acoustic modeling algorithm interpretation and discrimination on the voice command 11, generating a discrimination instruction 21;

Step 14: the interaction manager device 2 interpreted discrimination instruction 21, generated into a machine basic control command and/or a machine motion control command, is transmitted back (return) to the autonomous reaction device 1;

Step 15: the discrimination instruction 21 of the interaction manager device 2 is automatically transmitted back to the autonomous reaction device 1 according to the return command (return command);

Step 16: the autonomous reaction device 1 responds to the transmitted back discrimination instruction 21 of the interaction manager device 2 for accuracy of the input of the voice command 11, if yes, Step 17 is performed, if no, Step 11 is performed;

Step 17: the autonomous reaction device 1 concurrently confirms the execution of the discrimination instruction 21;

Step 18: the interaction manager device 2 executes transmission of the machine basic control command and/or the machine motion control command corresponding to a conditional request operations (conditional request) of a plurality of machining tasks of the industrial machinery 4;

Step 19: a upper controller 3 receives the machine basic control command and/or the machine motion control command to operate the driver 44 of the industrial machinery 4.

Four sources are disclosed in this paper for performing the interaction manager device 2 and the cloud service 5 acoustic modeling algorithms. When processing or performing the instructions, through the interaction manager device 2, combined with at least one processor performing a method in the cloud service 5, the interaction manager device 2 combines with more than one cloud service 5 to process or execute the instructions of the system. In the following descriptions, many detailed particulars are elaborated (for example, specific instruction computations, data formatting, processor configuration, micro-architecture details, computational sequences, etc.). However, embodiments can be implemented without these detailed particulars. In other embodiments, well-known circuits, architecture, and technicalities, are not shown in detail to avoid obscuring the understanding of the description. In effort to achieve the above objectives, a second voice work machine control method of the present invention is provided, comprising the following steps in one period cycle:

Step 21: an autonomous reaction device 1 is capable of receiving an input of a voice command 11 (voice command), establishing or executing a conditional request operation (conditional request) of one or more machining tasks of a specific industrial machinery 4;

Step 22: an interaction manager device 2 receives the output voice command 11 of the autonomous reaction device 1, the interaction manager device 2 concurrently initializes a return command (return command) of the voice command 11;

Step 23: the interaction management device 2, through a connection 6 (connecting line), connecting to a cloud service 5, executes acoustic modeling algorithm computational interpretation and discrimination on the voice command 11, generating a discrimination instruction 21;

Step 24: the interpreted discrimination instruction 21, generated into a machine basic control command and/or a machine motion control command, is transmitted back (return) to the interaction manager device 2;

Step 25: the discrimination instruction 21 of the interaction manager device 2 is automatically transmitted back to the autonomous reaction device 1 according to the return command (return command)

Step 26: the autonomous reaction device 1 responds to the transmitted back discrimination instruction 21 of the interaction manager device 2 for accuracy of the input of the voice command 11, if yes, Step 27 is performed, if no, Step 21 is performed;

Step 27: the autonomous reaction device 1 concurrently confirms the execution of the discrimination instruction 21;

Step 28: the interaction manager device 2 executes transmission of the machine basic control command and/or the machine motion control command corresponding to a conditional request operation (conditional request) of a plurality of machining tasks of the industrial machinery 4.

Step 29: a upper controller 3 receives the machine basic control command and/or the machine motion control command to operate the driver 44 of the industrial machinery 4.

The advantage of the present invention is that a voice command 11, though, one period cycle, can separately be executed a voice command input program, an interpretation and discrimination voice command program, a discrimination instruction generation program, execution of a discrimination program, and an operation of a driver 44. Then, an output voice command 11 can be obtained by two different interpretation and discrimination sensing methods, and then, through acoustic modeling algorithm computations, the discrimination instruction 21 can be obtained, utilizing the high accuracy of the return command (return command) automatically transmitting back the discrimination instruction 21 to make up for the input accuracy of the voice command 11. Therefore, the present invention can more accurately discriminate the operation conditional request (conditional request) of the machining task of the industrial machinery 4.

FIGS. 4 and 5 is a conceptual block diagram of the example of an industrial machinery 4 according to an input control of a voice command 11. In FIG. 4, the autonomous reaction device 11 comprises the input of the voice command 11. The input of the voice command 11 is capable of detecting a variety of observable quantity controls, parameter instructions, status monitoring and motion tracking voice commands 11 corresponding to the processes implemented by the industrial machinery 4. The interaction manager device 2, subject to program execution, receives the output voice command 11 of the autonomous reaction device 1. The interaction manager device 2 concurrently initializes a return command (return command) of the voice command 11. The interaction manager device 2 executes acoustic modeling algorithm interpretation and discrimination on the voice command 11, generating a discrimination instruction 21 or, as shown in FIG. 5, the interaction management device 2, through a connection 6 (connecting line), connecting with a cloud service 5, executes acoustic modeling algorithmic computational interpretation and discrimination on the voice command 11 to generate a discrimination instruction 21, which is loopback (loopback) and provided to the interaction manager device 2, the discrimination instruction received (receive) by the cloud service 5 comprises, as an example, control of the related program system processes (comprising a driver 44 performing zone return, jog, positioning, and handle movement etc. motion control), transmission parameter instructions, and status monitoring and automatically executing interpretation of at least one machine basic control command and/or at least one machine motion control command and providing it to the upper controller 3 for the industrial machinery 4 to execute a plurality of driver parameter fetch, process decision-making, control cycling, and performing multi-axis motion control.

Next, the high level controller 3 comprises the memory unit 31. The memory unit 31 is capable of storing and receiving the machine basic control command and the machine motion control command (for example, the motion path instruction, the positioning axis, the moving speed and the steering angle, and the like, and the accompanying mutual correspondence system, etc.), wherein, the memory unit 31 uses a processing component to form a network, for processing of the discrimination instruction 21 with the machine basic control command, and then, the connection 6 is output to the database 43 of the industrial machinery 4. The discrimination instruction 21 comprising the machine basic control command and/or the machine motion control command is capable of being transmitted to the processing unit 32 through the communication network 33 connection. The processing unit 32 is capable of processing all of the received machine basic control command and/or the machine motion control command and through the communication network 33 the machine basic control command and/or the machine motion control command that has been processed are loopbacked (loopback) to the memory unit 31.

The industrial machinery 4 comprises an interpreter device 41, a logic controller 42, a plurality of databases 43, and a plurality of drivers 44. The interpreter device 41 is used as an interface to receive the machine basic control command and/or the machine motion control command. The logic controller 42 is capable of processing the received motion path planning and motion parameter control in the machine basic control command and/or the machine motion control command and the database 43 is capable of storing the machine basic control command and/or the machine motion control command that has been received and processed. The driver 44 provides the industrial machinery 4 with specific functionality and may comprise driving a single function of a tool component, or driving a group of tool components that essentially have the same or different functionality.

The autonomous reaction device 1 of the present invention is used to assist in the interaction of the high level controller 3 with the industrial machinery 4. The information corresponding to the input of the voice command 11 generated by the embodiments of the autonomous reaction device 1 is capable of being received and gradually-increasingly-like transmitted to the high level controller 3. In addition, the communication network 33 of the high level controller 3 is capable of inputting the basic machine control command and/or the machine motion control command from the industrial machinery 4 through the connection 6, and also through the connection 6 is capable of outputting the basic machine control command and/or the machine motion control command. The industrial machinery 4, then, is capable of processing the received motion path planning and motion parameter control in the basic machine control command and/or the machine motion control command through the logic controller 42. Because the basic machine control command and/or the machine motion control command is received, stored, processed, and transmitted by the high level controller 3, the autonomous reaction device 1 depends on the basic machine control command and/or the machine motion control command and the driver 44 is capable of comprising a number of improvements. That is, the improvements comprise: (1) the high level controller 3 and the autonomous reaction device 1 becomes more and more independent over time; (2) the interaction manager device 2 improves the manufacturing quality of the output of the high level controller 3 to the driver 44 (for example, it is easier to identify the source of problems, or it is capable of predicting system failure); and (3) the performance of the high level controller 3 becomes better and better or the high level controller 3 improves production results at a faster rate and uses less resources, over time.

The memory unit 31 of the high level controller 3 comprises a hierarchy of functional memory components. When the autonomous reaction device 1 is initialized or the structure organized, the database 43 is capable of being used to store a received input (e.g., an input of the voice command 11). Furthermore, the memory unit 31 is capable of storing (a) after initialization of the autonomous reaction device 1, the input of the voice command 11 for training of the high level controller 11 and (b) connection 6 output of the high level controller 3, comprising, the output of the program source, program inching, program positioning and historical output of the program parameter readings of the driver 44, program process determinations, and program loop control. The database 43 is capable of being transmitted to the autonomous reaction device 1 or the driver 44 through the industrial machinery 4 via the logic controller 42.

Through the input of the autonomous reaction device 1 (e.g., input of a voice command of a human being) or a connection 6 (connecting line), connected to the cloud service 5, the vowels, consonants, numbers, large vocabulary amount, non-specific people, and continuous voice recognition of the discrimination instruction 21, or relationship between two or more identification variables, or identification information are learned. Such identification information is capable of assisting in guiding the system based on the industrial machinery 4 in the learning process of the autonomous reaction device 1. Furthermore, in some aspects, the autonomous reaction device 1 may be important as an input to the industrial machinery 4, and such importance may be related to the informational relevance of the specific process implemented by the autonomous reaction device 1. For example, the industrial machinery 4 is capable of determining that the result of the processing task for the production process has timed out, such that failure rate is capable of being an attribute transmitted to the autonomous reaction device 1.

The processing unit 32, in turn, comprises information for processing the following: receiving or obtaining specific-type input of the basic machine control command and/or the machine motion control command (for example, specific-type control command, such as a value, sequence, time series, functions, machining category etc.), and through the processing unit 32, implementation computations are executed, subject to a specific-type of output information by the program. The output information is capable of being transmitted to one or more components of the memory unit 31 through the communication network 33. In some aspects, the processing unit 32 is capable of reading and modifying an instance of a machine basic control command structure or a machine motion control command structure stored in the memory unit 31 or a machine basic control command type or a machine motion control command type, and is also capable of writing in a new machine basic control command structure or a new machine motion control command structure. Other aspects of the processing unit 32 are capable of providing for adjustments to a wide variety of numerical properties, such as suitability, importance, optimization/suppression energy, and communication prioritization. The processing unit 32 has a dynamic priority order that determines the category of the input used to process the machine basic control commands or the machine motion control commands. Units with a higher priority order will process the input of the machine basic control command or the machine motion control command earlier than the units with a lower priority order. If the processing unit 32 that has been processing the specific information has not been able to execute input learning of a new machine basic control command or the machine motion control command, for example, ranking by program execution, or ranking function of the better or worst discrimination output operations corresponding to the autonomous reaction device 1, then, the priority order of the corresponding processing unit 32 will be lowered. Conversely, if there is an input by the program to execute a new machine basic control command or the machine motion control command, the priority order of the processing unit 32 is raised.

It should be understood that the processing unit 32, through the processing unit 32 having a priority order, simulates human beings for specific scenario inputs of the machine basic control command or the machine motion control command to try to optimize the propensity of the first operation. If a new input of a machine basic control command or the machine motion control command operation is executed by the program, implementation of the operation continues in a subsequent substantially identical condition. Conversely, when new input of a machine basic control command or the machine motion control command operation cannot be executed by the program, the propensity to use the first operation to process the scenario is lowered, and a second operation is used. If the new input of a machine basic control command or the machine motion control command operation cannot be executed by the program of the second operation, then, its priority will be lowered, and changed to a third operation. The processing unit 32 will continue to take other operations until an input of a new machine basic control command or machine motion control command is executed by the program, and a higher priority order is attained by another operation. In a certain aspect, the autonomous reaction device 1 may be capable of providing the high level controller 3 with adjustments to the machine basic control command and/or machine motion control command, and initialization parameters. In other aspects, the driver 44 is capable of supplying maintenance of the machine basic control command or machine motion control command corresponding to the autonomous reaction device 1. In other aspects, the driver 44 is capable of being executed by a program and provides computer simulated results of the machine basic control command and/or machine motion control command being implemented by the autonomous reaction device 1. The result of such simulation by the program execution is capable of being used as training for the high level controller 3 to train the machine basic control command or machine motion control command. In addition, the simulation or end user is capable of transmitting optimizations of the corresponding machine basic control command and/or machine motion control command to the autonomous reaction device 1.

The high level controller 3 is capable of being trained through one or more training cycles, and each training cycle is capable of developing the industrial machinery 4 based on human-machine interaction to: (1) being capable of executing a large amount of functions without needing external involvement; (2) providing better response, such as, after improvements, being capable of providing accurateness or correctness when diagnosing a root cause of a problem of the health of a manufacturing system; (3) improving performance, such as faster response times, reducing memory usage, or improving product quality. If training of the machine basic control command or machine motion control command is the input of the voice command 11 collected from the machine basic control command or machine motion control command, and the input of the voice command 11 of the machine basic control command or machine motion control command corresponds to the machine basic control command and/or machine motion control command correction or standard operation of the autonomous reaction device 1 or through the interaction manager device 2, then, the machine basic control command and/or machine motion control command is capable of being continuously transmitted (continuous transmission) to the high level controller 3 through the interaction manager device 2. When training of the machine basic control command and/or machine motion control command is collecting from one or more than one cloud service 5, such training of the machine basic control command and/or machine motion control command is capable of being regarded as training expected behavior. The training period of the basic control command of the machine and/or the machine motion control command can help the host controller 3 to learn the expected behavior of the industrial machinery 4. The training period based on training of the machine and/or the machine motion control command is capable of assisting the high level controller 3 to learn the expected behavior of the industrial machinery 4.

The invention claimed is:

1. A voice control system for operating machinery, distinguishing characteristics are, comprising:
   an autonomous reaction device, receiving an input of a voice command to establish or to execute a conditional request operation of at least one machining task of a specific industrial machinery;
   an interaction manager device, for receiving the output of the voice command and concurrently initializing a return command of the voice command, the interaction manager device performing interpretation and discrimination on the voice command to generate a discrimination instruction, then, the interpreted discrimination instruction, generated into a machine basic control command and/or a machine motion control command, is transmitted back to the autonomous reaction device, the discrimination instruction of the interaction manager device, according to the return command, is automatically transmitted back to the autonomous reaction device to execute transmission of the machine basic control command and/or the machine motion control command corresponding to a plurality of operations of machining tasks of the industrial machinery; and
   a upper controller, receiving the machine basic control command and/or the machine motion control command to operate a driver of the industrial machinery.

2. The voice control system for operating machinery of claim 1, distinguishing characteristics, the input of the voice command generated machine basic control command and/or the machine motion control command is through a connection, enabling connection with the upper controller to complete the machining task of the industrial machinery, the machining task further comprising operation of at least one single-axis motion machining task or at least one multi-axis motion machining task or is learning, and analysis of corresponding control data of the machining task of the industrial machinery.

3. The voice control system for operating machinery of claim 1, distinguishing characteristics, the input of the voice command is capable of detecting a variety of observable quantity controls, parameter instructions, status monitoring and motion tracking voice commands corresponding to the processes implemented by the industrial machinery.

4. A voice control system for operating machinery, distinguishing characteristics, comprising:
   an autonomous reaction device, receiving an input of a voice command to establish or to execute a conditional request operation of at least one machining task of an industrial machinery;
   an interaction manager device, for receiving the outputted input of the voice command and concurrently initiating a return command of the voice command, then, through a connection, connecting with a cloud service performing computational interpretation and discrimination of the voice command to generate a discrimination instruction, then, the interpreted discrimination instruction, generated into a machine basic control command and/or a machine motion control command, is loopback and provided to the interaction manager device, the discrimination instruction of the interaction manager device, according to the return command, is automatically transmitted back to the autonomous reaction device to execute transmission of the machine basic control command and/or the machine motion control command corresponding to a plurality of machining task operations of the industrial machinery; and a upper controller, receiving the machine basic control command and/or the machine motion control command to operate a driver of the industrial machinery.

5. The voice control system for operating machinery of claim 4, distinguishing characteristics, wherein the autonomous reaction device, through a connection, connecting with a cloud service executing acoustic modeling algorithmic computational interpretation and discrimination on the voice command to generate a discrimination instruction, which is loopback and provided to the interaction manager device, the discrimination instruction received by the cloud service comprising control of the related program system processes comprising a driver performing zone return, jog, positioning, and handle movement motion control, transmission parameter instructions, and status monitoring and automatically executing interpretation of at least one machine basic control command and/or at least one machine motion control command and providing it to the upper controller for the industrial machinery to execute a plurality of driver parameter fetch, process decision-making, control cycling, and performing multi-axis motion control.

\* \* \* \* \*